United States Patent
Ahn et al.

(10) Patent No.: US 7,474,901 B2
(45) Date of Patent: Jan. 6, 2009

(54) UPLINK DPCCH TRANSMISSION POWER CONTROL FOR TERMINAL IN SOFT HANDOVER

(75) Inventors: Joon-Kui Ahn, Seoul (KR); Dong-Wook Roh, Seoul (KR); Dong-Hee Shim, Seoul (KR); Min-Jung Kim, Gyeonggi-Do (KR); Seoung-Hoon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 630 days.

(21) Appl. No.: 10/700,041

(22) Filed: Nov. 4, 2003

(65) Prior Publication Data

US 2004/0180687 A1 Sep. 16, 2004

(30) Foreign Application Priority Data

Nov. 4, 2002 (KR) .................. 10-2002-0067934
Nov. 4, 2002 (KR) .................. 10-2002-0067951

(51) Int. Cl.
H04B 7/00 (2006.01)

(52) U.S. Cl. ........................... 455/522; 455/69

(58) Field of Classification Search ............ 455/69, 455/442, 522; 370/318
See application file for complete search history.

(56) References Cited

U.S. PATENT DOCUMENTS

| 6,374,118 | B1 |   | 4/2002 | Toskala et al. | ............ 455/522 |
| 6,603,980 | B1 | * | 8/2003 | Kitagawa et al. | ............ 455/522 |
| 6,850,771 | B2 | * | 2/2005 | Malladi et al. | ............ 455/522 |

FOREIGN PATENT DOCUMENTS

| KR | 2002-0038823 | 5/2002 |
| KR | 2002-0061125 | 7/2002 |
| KR | 2003-0035605 | 5/2003 |

* cited by examiner

*Primary Examiner*—Nguyen Vo
*Assistant Examiner*—Raymond S Dean
(74) *Attorney, Agent, or Firm*—Ked & Associates, LLP

(57) ABSTRACT

A power control method in a mobile communication system quickly reduces DPCCH power when ending the transmission of a HS-DPCCH signal down to a level requested by the transmission of a current DPCCH signal, thereby enabling effective control of uplink DPCCH power of a terminal and to significantly decrease uplink interference in the overall mobile communication system.

24 Claims, 5 Drawing Sheets

N Slot Group (N=3)

UPLINK DPCCH TRANSMISSION POWER CONTROL FOR TERMINAL IN SOFT HANDOVER

BACKGROUND OF THE INVENTION

1. Field of the Invention

The present invention relates to a mobile communication system, and more particularly, to a power control method in a mobile communication system.

2. Background of the Related Art

Generally, in a mobile communication system, power control in the uplink direction is essential to increase system reception capacity. Specifically, a terminal in soft handover receives power control commands from a multitude of base stations and considers the commands to determine the power on an uplink channel to cope with a receivable level of each base station. Even though the terminal in soft handover simultaneously transmits a plurality of channel signals, there occurs a case that some channels may be received by one base station only. In such a case, the terminal should adjust its power control for the uplink channels so that the base station can efficiently receive the signals.

In each cell of a mobile communication system, the base station may provide a plurality of terminals with a downlink common channel that belongs to a specific one of the terminals for a specific time. In order to control such a downlink common channel, each terminal transmits control information on an uplink channel to the base station. For such control information transmission an additional uplink control channel signal is used.

However, since general uplink channel signals are received by all the neighboring base stations, the transmission power for the uplink signal needs to be at a level high enough to be received correctly by any one of the base stations. In case that the uplink transmission power is adjusted to fit a base station other than the base station transmitting the downlink common channel, the base station transmitting the downlink common channel may not correctly receive an additional uplink control channel for the downlink common channel.

Hence, when signals are transmitted on a control channel for controlling a downlink common channel, the terminal increases the transmission power for the additional control channel relative to the other uplink channels. For example, an IMT-200 HSDPA (high speed downlink packet access) system is explained as follows.

The HS-DPCCH (high speed dedicated physical control channel) of the IMT-2000 HSDPA system corresponds to such an additional uplink control channel, and an additional power control method has been proposed for efficient reception of HS-DPCCH signals. This method improves reception performance of the HS-DPCCH at the base station, but interference of the uplink is greater than that of using the related art power control method.

The HS-DPCCH amongst various uplink channels of the IMT-2000 HSDPA system is received only by a base station that provides a terminal, which is in soft handover with a plurality of base stations, with HSDPA. Hereinafter, such a base station is called a HSDPA base station. The terminal in soft handover transmits a HS-DPCCH signal using power that is in proportion to the transmission power of the uplink DPCCH signal, and the base station uses a pilot signal transmitted through the DPCCH to demodulate the HS-DPCCH signal.

In DPCCH power control, in case that any one of the base stations participating in soft handover can receive the DPCCH signal correctly, a terminal sets the power (minimum power) of such a case as the transmission power of the DPCCH. Hence, the power of the pilot transmitted on the DPCCH may be insufficient to demodulate the HS-DPCCH signal received by the single HSDPA base station only. Thus, in HS-DPCCH power control, a terminal deduces a transmission power of the DPCCH signal required for demodulating the HS-DPCCH signal at the moment of initiating transmission of the HS-DPCCH signal and increases the power level of the DPCCH by as much as the deduced amount to transmit the HS-DPCCH signal.

DPCCH power control of a terminal in soft handover is explained as follows.

First of all, a terminal in the IMT-2000 system continuously transmits DPCCH signals as a general control channel in the uplink direction together with general traffic channels. Moreover, the terminal transmits a pilot for traffic channel demodulation as well as other necessary control information on the DPCCH.

The terminal in soft handover receives power control commands for the DPCCH from all base stations participating in soft handover. In this case, the received power of the DPCCH signal at each of the base stations differs from each other, depending on the respective environments of the base stations. And, the base stations transmit separate power control commands according to the corresponding received power of the DPCCH signal at each of the base stations.

FIG. 1 is a diagram of a terminal and neighboring base stations in soft handover.

Referring to FIG. 1, a power control command transferred to a terminal 12 from an $i^{th}$ base station is indicated by $TPC_i$. Assuming that it is a power-up command if $TPC_i=1$ and that it is a power-down command if $TPC_i=-1$, FIG. 1 shows a situation where a base station 11A sends a power-down command and other base stations 11N−1 and 11N send power-up commands, respectively. If any one of the DPCCH power control commands received from the base stations 11A to 11N is a power-down command, the terminal 12 judges that at least one of the base stations can receive the DPCCH signal and then lowers the power intensity of the DPCCH by as much as $\Delta TPC$, which is a predetermined power control constant. If all of the received DPCCH power control commands are power-up commands, the power intensity of the DPCCH is increased by as much as $\Delta TPC$.

Namely, if each of $TPC_1, TPC_2, \ldots, TPC_{N-1}$, and $TPC_N$ is '1', then TPC_comb=1. If at least one of $TPC_1, TPC_2, \ldots, TPC_{N-1}$, and $TPC_N$ is '−1', then TPC_comb=−1. And, calculation of $\Delta$ DPCCH is represented by Equation 1:

$$\Delta_{DPCCH}=TPC\_comb \times \Delta TPC \qquad \text{[Equation 1]}$$

wherein TPC_comb is a power control value that is determined by the terminal 12 considering the power control commands of the base stations 11A to 11N, and $\Delta$ DPCCH is a power increment applied to each slot.

A terminal receiving such power control commands can employ one of two types of pre-set power control methods, either a "power control method 1" or a "power control method 2", for calculating the power control value TPC_comb to be applied to the DPCCH.

FIG. 5A shows the power control method 1, wherein the terminal determines the DPCCH transmit power by appropriately using the power control commands received from all base stations for each and every transmission slot.

FIG. 5B shows power control method 2, wherein the terminal determines the DPCCH transmit power according to units of N slot groups (N>1). FIG. 5B shows an example of N=3, wherein the boundary of each N slot group is previously set. For any N slot group, the DPCCH transmit power is not changed for the first N−1 slot, while for the last $N^{th}$ slot, the DPCCH transmit power is determined by using all power control commands received from all base stations during the N slot group. Thus, the DPCCH transmit power can change one time for each N slot.

HS-DPCCH power control of a terminal in soft handover is explained in the following.

FIG. 2 is a diagram of transmitting DPCCH and HS-DPCCH signals.

Referring to FIG. 2, a terminal, which is in soft handover and performs HSDPA service, continuously transmits a DPCCH signal as a general control channel signal in the uplink direction, and also intermittently transmits an HS-DPCCH signal as an additional control channel signal for HSDPA. In this case, a corresponding base station uses a pilot signal transmitted on the DPCCH for demodulation of the HS-DPCCH signal. The received power of the HS-DPCCH is in proportion to that of the DPCCH and depends on the variation of the power of the DPCCH.

While the terminal is in soft handover, a DPCCH signal is received by all of the base stations participating in soft handover. However, a HS-DPCCH signal is received only by a HSDPA base station. If the transmission power of the DPCCH is set to be such that any one of the base stations participating in soft handover may be able to receive it correctly, the received power of the DPCCH signal transmitted by the terminal may be insufficient to demodulate the HS-DPCCH signal with the pilot symbols in the DPCCH signal at the HSPDA base station.

Related Art HS-DPCCH Power Control Method

In order to overcome this problem, the terminal, which is in soft handover and performs HSDPA service, raises the transmission power of the DPCCH to a level requested by the HSDPA base station for only in the section (i.e., slot) for transmitting the HS-DPCCH.

FIG. 3 is a diagram of a HS-DPCCH power control method according to the related art.

$TPC_{sc}(i)$ is a power control command of a HSDPA base station for an $i^{th}$ previous slot of HS-DPCCH signal transmission slots, and TPC_comb(i) is a power control value of a HSDPA base station for an $i^{th}$ previous slot of HS-DPCCH signal transmission slots. The power control value is determined in a manner that the terminal 12 considers the power control commands of the base stations 11A to 11N.

Before transmitting a HS-DPCCH signal, the terminal stores the values of TPC_comb(1), TPC_comb(2), . . . , TPC_comb(K_used−1), and TPC_comb(K_used), and also stores $TPC_{sc}(1)$ $TPC_{sc}(2)$, . . . , $TPC_{sc}$(K_used−1), and $TPC_{sc}$(K_used) for a K_used slot, and uses theses values to deduce 'd'. The 'd' is a value for additional power required for transmitting a DPCCH signal in the slot transmitting a HS-DPCCH signal. The deducing of 'd' may vary according to system implementation. The increment of power required for a HS-DPCCH signal transmission is calculated by Equation 2:

$$\Delta_{DPCCH} = d \times \Delta TPC + TPC_{sc}(HS\_start) \times \Delta TPC \quad \text{[Equation 2]}$$

In Equation 2, $TPC_{sc}$(HS_start) is a power control command for the slot on which HS-DPCCH is transmitted, and is transmitted from a HSDPA base station to a terminal.

The K_used value is attained by using a constant $K_{HS\_TPC}$, e.g., the $K_{HS\_TPC}$ value may be set as a default. However, after the HS-DPCCH signal has been transmitted, if another HS-DPCCH signal is transmitted before a slot time of as much as $K_{HS\_TPC}$ passes, the number of slots between the two HS-DPCCH signals is set as a new K_used value. DPCCH power control in those slots that do not transmit a HS-DPCCH signal follows the 'DPCCH power control method'.

Related Art DPCCH Transmit Power Control

The related art DPCCH transmit power control methods include a modified power control method A and a modified power control method B.

FIG. 6A shows the modified power control method A for a terminal (using the previously described power control method 2) that transmits HS-DPCCH. Assuming that the slot for HS-DPCCH is the $n^{th}$ slot, the DPCCH transmit power required for the slot that transmits the HS-DPCCH is deduced by using the power control commands from the (n−K_est)$^{th}$ slot to the $n^{th}$ slot, and by using power control history (e.g., previous power control). By using this deduction, the DPCCH transmit power is determined. Thus, the DPCCH transmit power for the transmitting slot is increased or decreased by a value that is greater than ΔTPC, compared with the transmit power of the previous slot. FIG. 6A shows an example where K_est=5. For all other slot besides the slot that transmits HS-DPCCH, the power control method 2 is used for DPCCH transmit power control.

FIG. 6B shows the modified power control method B for a terminal (using the previously described power control method 2) that transmits HS-DPCCH. Assuming that the slot for HS-DPCCH is the $n^{th}$ slot, the terminal changes the DPCCH transmit power control method to the power control method 1 beginning from the (n−K_mod)$^{th}$ slot, and the power of each slot is determined by only the power control commands from the base station performing the HSDPA service. In FIG. 6B, it is assumed that K_mod=5. After completion of HS-DPCCH transmission, the terminal considers the power control commands from all the base stations to determine the power of each slot. Also, at the boundary of the first N slot group or the boundary of the first M×N slot group that appears after HS-DPCCH transmission, the terminal changes the transmit power control method back to the power control method 2. Here, M is a random constant.

Problems of the Related Art

However, in the related art HS-DPCCH power control method of FIG. 3, since the power adjusted to increase is left alone (i.e., not re-adjusted) for a predetermined time despite the completion of HS-DPCCH signal transmission, the power of a general control channel (DPCCH) is unnecessarily maintained high.

Namely, the power of the DPCCH in a slot transmitting the HS-DPCCH necessarily increases. When the terminal goes back to using the DPCCH power control method in soft handover after completing the HS-DPCCH transmission, this power-down process may require many slots to complete until the power naturally (and gradually) returns to a level that is appropriate for the DPCCH. Hence, the DPCCH signal is transmitted with unnecessarily high power for certain slot sections (i.e., those slots immediately following the slot used in transmitting the HS-DPCCH), causing interference intensity in the overall mobile communication system to undesirably increase.

Also, referring to FIGS. 6A and 6B, in the related art DPCCH transmit power control, the terminal (operating under the power control method 2) employs the modified power control methods A and B for DPCCH transmit power control at a slot in which HS-DPCCH is transmitted. For those slots after completion of HS-DPCCH transmission, because the DPCCH transmit power changes at every N slots, the time required for adjusting the DPCCH transmit power for transmitting HS-DPCCH and then waiting for the DPCCH transmit power to return to its normal (appropriate) level is undesirably long. This results in unwanted interference within the overall mobile communication system.

SUMMARY OF THE INVENTION

Accordingly, the present invention is directed to a power control method in a mobile communication system that substantially obviates one or more problems due to limitations and disadvantages of the related art.

An object of the present invention is to provide a power control method in a mobile communication system, by which the power adjusted upward for specific control channel signal transmission of the uplink is quickly re-adjusted for transmission of general control channel signals.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a mobile communication terminal continuously transmitting a general control channel signal and intermittently transmitting a specific control channel signal, a power control method according to the present invention includes the steps of increasing power of a general control channel to a power level requested to demodulate specific control channel transmission, once transmission of the specific control channel signal is executed and adjusting the increased power to meet a power level requested by the current general control channel transmission if the transmission is completed.

Preferably, the adjusting step includes the steps of removing power level increment from the increased power and re-adjusting the increased power from which the power level increment is removed to the power level requested by the current general control channel transmission.

More preferably, the power level increment can be removed by using an equation of '{[increased power]+[−d× $\Delta$TPC]}'.

More preferably, the power level increment can be removed by using an equation of '(increased power)−Max{0, [d−f(K_intv)]}'.

More preferably, the re-adjusting step can be carried out by using an equation of '(power−d)+[TPC_comb(HS_end)+y]× $\Delta$TPC'.

More preferably, the terminal performs HSDPA (high speed downlink packet access) service.

Preferably, the specific control channel can be a HS_DPCCH (high speed-dedicated physical control channel) in a HSDPA system and the general control channel is a DPCCH (dedicated physical control channel).

Preferably, the terminal is in soft handover.

More preferably, the terminal performs HSDPA (high speed downlink packet access) service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

HS-DPCCH Power Control Method of the Present Invention

In a terminal, which continuously transmits a general control channel signal and intermittently transmits a specific control channel signal, a method of controlling control channel power of a radio communication terminal according to the present invention includes the steps of increasing the power of a general control channel to a power level requested to demodulate a specific control channel transmission once transmission of the specific control channel signal is executed, and adjusting the increased power to meet a power level requested by the current general control channel transmission if the specific control channel transmission is completed.

Figure 1:
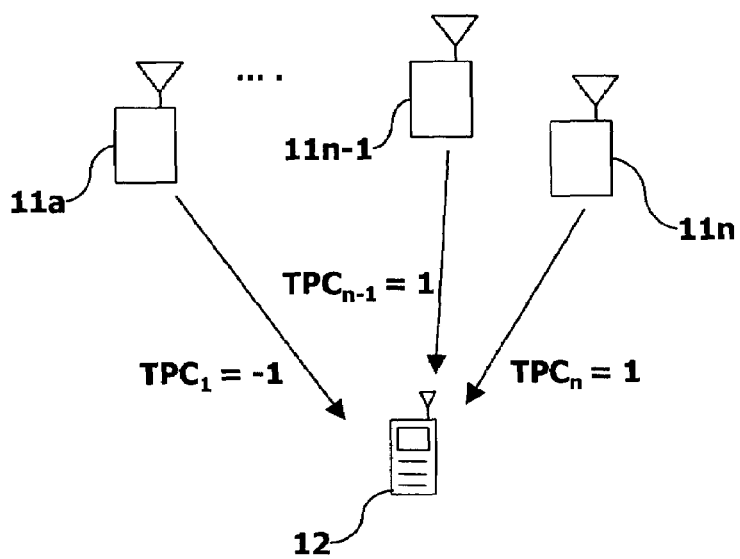
FIG. 1 is a diagram of terminal and neighboring base stations in soft handover.
Figure 2:
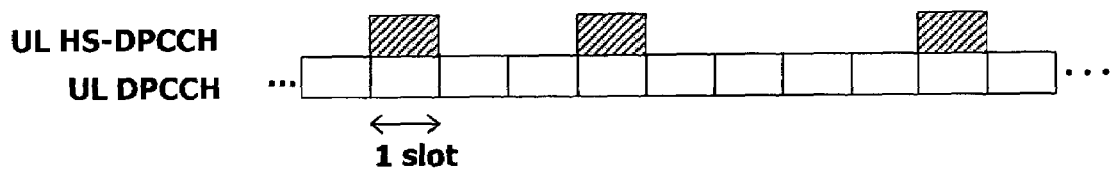
FIG. 2 is a diagram of transmitting DPCCH and HS-DPCCH signals.
Figure 3:
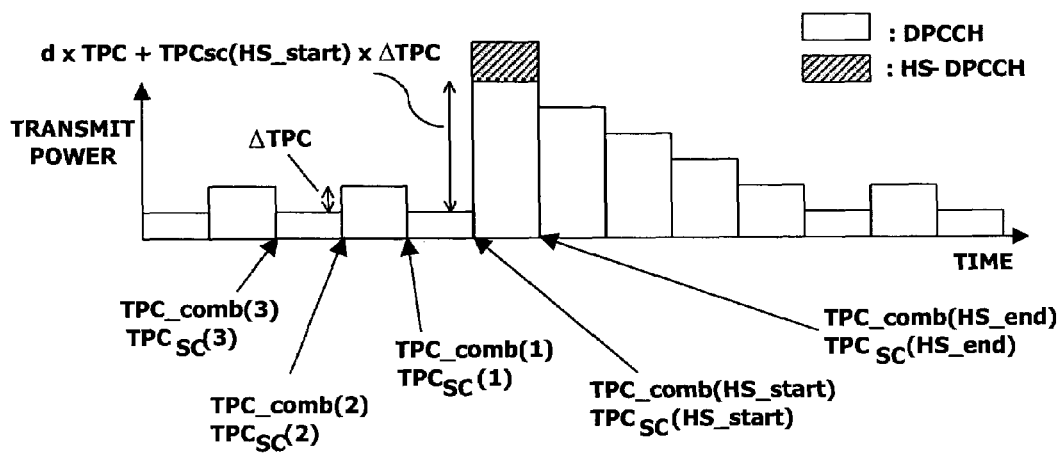
FIG. 3 is a diagram of HS-DPCCH power control method according to a related art.
Figure 4:
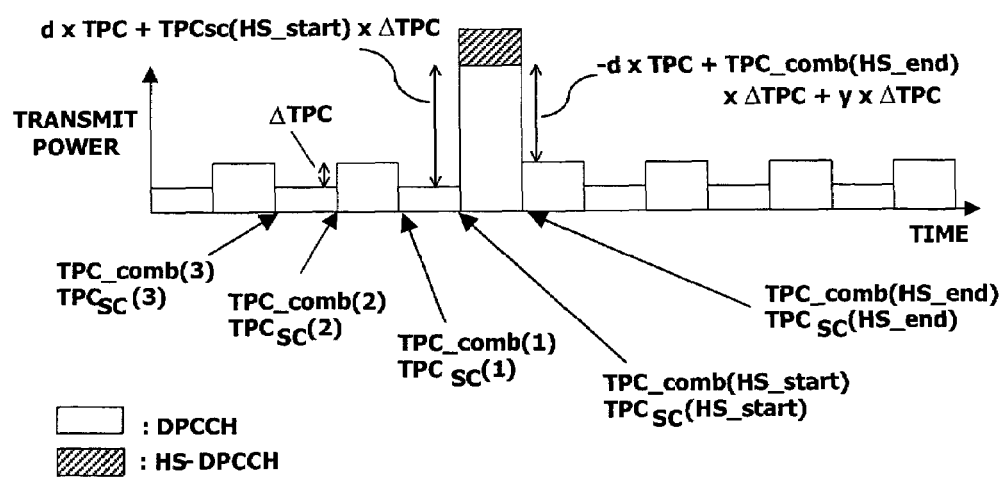
FIG. 4 is a diagram of a power control method according to a preferred embodiment of the present invention.
Figure 5A:
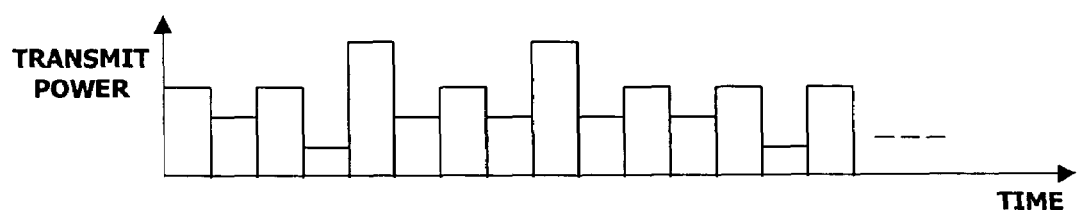
FIG. 5A shows the power control method 1 of the related art.
Figure 5B:
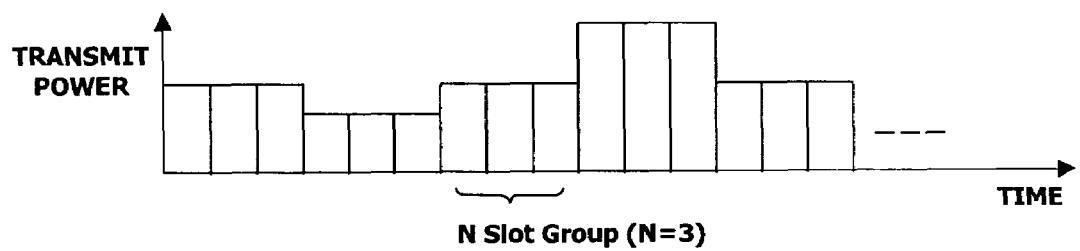
FIG. 5B shows the power control method 2 of the related art.

FIG. 4 is a diagram of a power control method according to one embodiment of the present invention.

Referring to FIG. 4, the present invention uses a general HS-DPCCH power control method in which a terminal in soft handover in a HSDPA system appropriately adjusts the DPCCH power in the HS-DPCCH signal transmission section (slot or slots). However, the present invention quickly reduces the DPCCH power down to a level requested by transmission of a current DPCCH signal when ending the transmission of the HS-DPCCH signal.

In the present invention, the terminal increases the transmission power of the DPCCH in a slot transmitting HS-DPCCH by as much as $\Delta_{DPCCH}$. Calculation of $\Delta_{DPCCH}$ follows Equation 2 of the related art.

However, the present invention differs from the related art in that the power of the DPCCH is reduced by as much as $\Delta_{DPCCH}$ in a first slot after completion of HS-DPCCH transmission.

Here, $\Delta_{DPCCH}$ is calculated by Equation 3.

$$\Delta_{DPCCH} = -d \times \Delta TPC + TPC\_comb(HS\_end) \times \Delta TPC + y \times \Delta TPC \quad \text{[Equation 3]}$$

In Equation 3, 'd' is a value of deducing the DPCCH power increment required for a HS-DPCCH transmission slot and 'TPC_comb(HS_end)' is a TPC_comb value at the slot after completion of the HS-DPCCH transmission.

The method proposed by the present invention immediately reduces DPCCH power (d×ΔTPC), which was increased at the beginning of HS-DPCCH transmission when ending the transmission of the HS-DPCCH signal.

Also, 'y' is a value for compensating power control error that may occur when quickly reducing the DPCCH power after HS-DPCCH transmission. Here, 'y' can be set in various manners according to the system as follows.

a) y=0
b) y=1
c) y=TPC_comb(HS_start)
d) y=TPC_comb(HS_start)+1

In c) and d), TPC_comb(HS_start) is a TPC_comb value in a slot where HS-DPCCH transmission starts.

After completion of transmitting the HS-DPCCH signal, transmission of the DPCCH signal, as shown in FIG. 4, follows a general power control method in soft handover.

Meanwhile, a power control method according to the present invention, which considers a transmission slot interval of the HS-DPCCH signal, is explained as follows.

When the power control method of the present invention is applied to DPCCH power control, if another HS-DPCCH is transmitted in the K_used slot after transmission of one HS-DPCCH, an interval between the two HS-DPCCH transmission slots may be insufficient for deducing the additional power required for transmitting the second HS-DPCCH. Considering such insufficiency, one of the following modified equations can replace Equation 3.

First, in case that the next HS-DPCCH transmission is performed before the K_used slot, an equation of calculating $\Delta_{DPCCH}$ is as follows:

$$\Delta_{DPCCH} = -d \times \Delta TPC + TPC\_comb(HS\_end) \times \Delta TPC + y \times \Delta TPC$$

In other cases, an equation of calculating $\Delta_{DPCCH}$ is as follows:

$$\Delta_{DPCCH} = TPC\_comb(HS\_end) \times \Delta TPC$$

Second, $\Delta_{DPCCH} = -\text{Max}\{0, [d-f(K\_intv)]\} \times \Delta TPC + TPC\_comb(HS\_end) \times \Delta TPC + y \times \Delta TPC$ whereby 'K_intv' means a slot interval from a current HS-DPCCH transmission slot to the next HS-DPCCH transmission slot. If another HS-DPCCH is transmitted in the slot next to the HS-DPCCH transmission slot, 'K_intv' is '0'. Also, 'f(K_intv)' is an arbitrary function using 'K_intv' as a factor. And, 'Max{a, b}' is a function of selecting the greater of 'a' or 'b'.

DPCCH Transmit Power Control of the Present Invention

The present invention also improves the related art method of adjusting the DPCCH transmit power in the HS-DPCCH slots for a terminal in soft handover in a IMT-2000 HSDPA system. In particular, for terminals operating under the power control method 2, the power control method 1 is applied for DPCCH transmit power control during at least a total of K_algo1 number of slots after HS-DPCCH transmission is completed. The DPCCH transmit power after the K_algo1 slot is again based on power control method 2.

Namely, according to the present invention, assuming that HS-DPCCH is transmitted at the $n^{th}$ slot, the terminal applies power control method 1 for DPCCH transmissions from the $(n+1)^{th}$ slot up to the boundary of the first N slot group or the first M×N slot group appearing after the $(n+1+K\_algo1)^{th}$ slot. Thereafter, the power control method 2 is applied again. Here, M is a random constant.

Figure 6A:
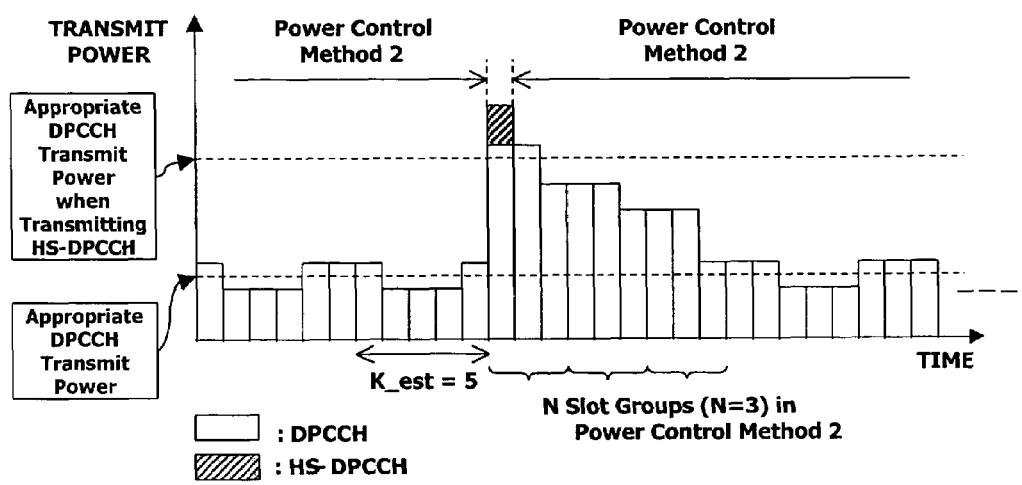
FIGS. 6A and 6B show the related art DPCCH transmit power control, in which the terminal (operating under the power control method 2) employs the modified power control methods A and B for DPCCH transmit power control at a slot in which HS-DPCCH is transmitted.
Figure 6B:
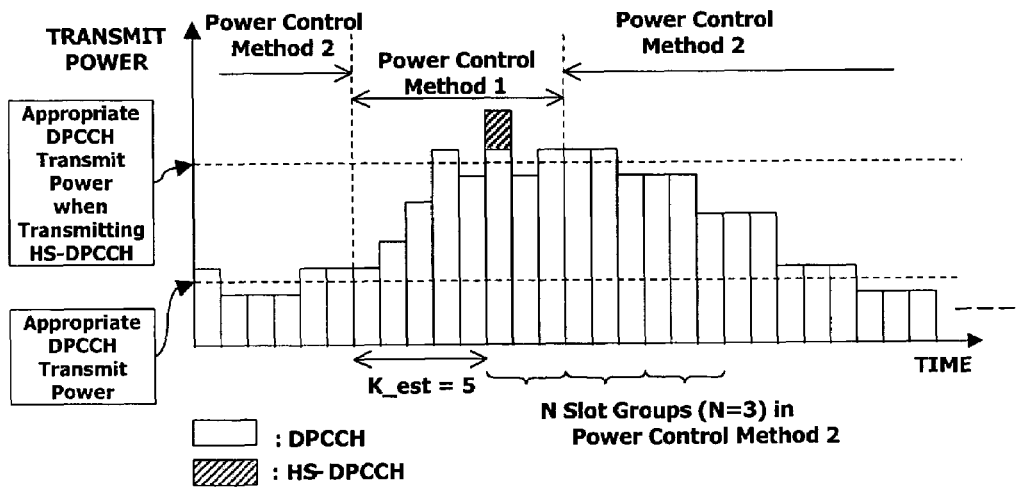
Figure 7A:
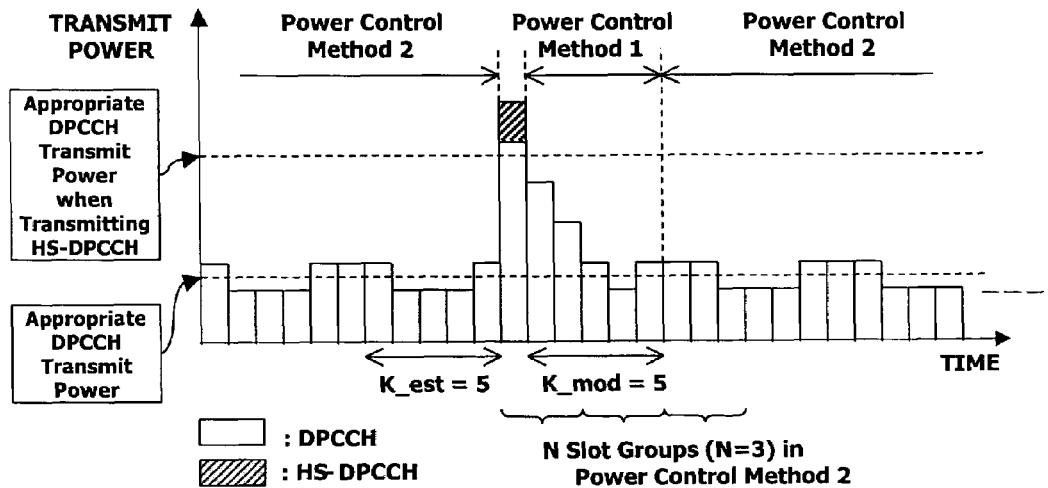
FIGS. 7A and 7B show examples of applying the present invention to the previously described modified power control methods A and B when K_algo=5.
Figure 7B:
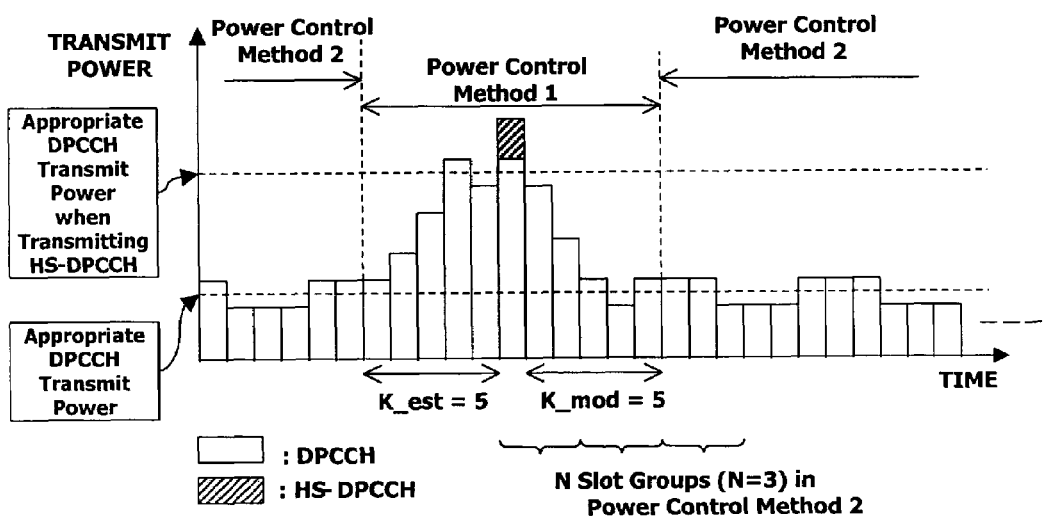

FIGS. 7A and 7B show examples of applying the present invention to the previously described modified power control methods A and B when K_algo=5. In comparison to the related art methods shown in FIGS. 6A and 6B, is can be clearly understood that the time required for the DPCCH transmit power to return to its appropriate level when using the present invention is relatively much shorter than that of the related art methods.

Accordingly, the power control methods according to the present invention quickly reduce DPCCH transmit power when ending the transmission of the HS-DPCCH signal down to a level requested by the transmission of a current DPCCH signal, thereby effectively controlling the uplink DPCCH power of a terminal and to greatly decrease uplink interference in the system that was the problematic in the related art.

While the present invention has been described and illustrated herein with reference to the preferred embodiments thereof, it will be apparent to those skilled in the art that various modifications and variations can be made therein without departing from the spirit and scope of the invention. Thus, it is intended that the present invention cover the modifications and variations of this invention that come within the scope of the appended claims and their equivalents.

What is claimed is:

1. In a mobile communication terminal continuously transmitting a general control channel signal and intermittently transmitting a specific control channel signal, a power control method comprising:

temporarily increasing a power of a general control channel to a power level requested to demodulate a specific control channel if transmission of the specific control channel signal is executed; and decreasing the increased power to meet a power level requested by a current general control channel transmission if the specific control channel transmission is completed, wherein decreasing the increased power includes removing a power level increment by an equation of {[increased power]+[−d×ΔTPC]}, wherein 'd' is a value of deducing the increment of the power of the general control channel and 'ΔTPC' is power intensity increasing or decreasing according to unit power level.

2. The power control method of claim 1, wherein the decreasing further includes re-adjusting the increased power from which the power level increment is removed to the power level requested by the current general control channel transmission.

3. The power control method of claim 2, wherein the power level increment is removed by an equation of '(increased power)−Max{0, [d−f(K_intv)]}', wherein 'K_intv' is a number of slots from a time point of ending the current specific control channel transmission to a time point of initiating a next specific control channel transmission, 'f(K_intv)' is an arbitrary function using 'K_intv' as a factor, and 'Max {a, b}' is a function of selecting the greater of 'a' or 'b'.

4. The power control method of claim 2, wherein the re-adjusting is carried out using an equation of '(power−d)+[TPC_comb(HS_end)+y]×ΔTPC', wherein 'TPC_comb(H-

S_end)' is a power control value found by using power control commands collected from base stations in soft handover for a slot after completion of HS-DPCCH signal transmission, and 'y' is a value for compensating power control error occurring due to abrupt power reduction.

5. The power control method of claim 2, wherein the re-adjusted power includes a value for compensating power control error occurring due to abrupt power reduction.

6. The power control method of claim 5, wherein the value for compensating the power control error is 0.

7. The power control method of claim 5, wherein the value for compensating the power control error is 1.

8. The power control method of claim 5, wherein the value for compensating the power control error is TPC_comb(HS_start) and wherein 'TPC_comb(HS_start)' is a power control value found by using power control commands collected from base stations in soft handover for a slot after completion of HS-DPCCH signal transmission.

9. The power control method of claim 5, wherein the value for compensating the power control error is [TPC_comb(HS_start)+1] and wherein 'TPC_comb(HS_start)' is a power control value found by using power control commands collected from base stations in soft handover for a slot after completion of HS-DPCCH signal transmission.

10. The power control method of claim 1, wherein the specific control channel is a high speed-dedicated physical control channel (HS-DPCCH) in a HSDPA system and the general control channel is dedicated physical control channel (DPCCH).

11. The power control method of claim 1, wherein the terminal is in soft handover.

12. The power control method of claim 11, wherein the terminal performs high speed downlink packet access (HS-DPA) service.

13. The power control method of claim 1, wherein the decreased power is applied to transmission of a first slot section after completion of the specific control channel transmission.

14. The power control method of claim 1, wherein a power level requested by the current general control channel transmission is determined by an equation of '$\Delta_{DPCCH} = (-d \times \Delta TPC) + [TPC\_comb(HS\_end) + y] \times \Delta TPC$', wherein 'd' is a value of deducing a general control channel power increment required for transmitting the specific control channel signal, 'TPC_comb(HS_end)' is a power control value found by using power control commands collected from base stations in soft handover for a slot after completion of HS-DPCCH signal transmission, and 'y' is a value for compensating power control error occurring due to abrupt power reduction.

15. A method of adjusting uplink transmission control power for a terminal, the method comprising:
    increasing a first uplink transmission power up to a second uplink transmission power such that a high speed control channel can be transmitted; and
    forcibly decreasing the second uplink transmission power back to the first uplink transmission control power after transmission of the high speed channel is completed, wherein decreasing the second uplink transmission power includes removing a power level increment by an equation of {[increased power]+[−d×ΔTPC]}, wherein 'd' relates to a value of deducing an increment of power of another control channel and 'ΔTPC' relates to power intensity increasing or decreasing according to unit power level.

16. The method of claim 15, wherein the first uplink transmission power is related to a dedicated physical control channel (DPCCH) transmission power.

17. The method of claim 15, wherein the high speed control channel is a high speed dedicated physical control channel (HS-DPCCH).

18. The method of claim 15, wherein the forcibly decreasing includes compensation for power control errors.

19. The method of claim 15, wherein the forcibly decreasing is applied by the terminal for a plurality of slots.

20. The method of claim 15, wherein the second uplink transmission power is related to a high-speed dedicated physical control channel (HS-DPCCH) transmission power.

21. A method of transmission on an uplink control channel for a terminal, the method comprising:
    adjusting an uplink transmission power from a first power level to a second power level;
    performing transmission on a high-speed control channel using the adjusted uplink transmission power; and
    re-adjusting the uplink transmission power from the second power level to the first power level after completing transmission on the high-speed control channel, wherein re-adjusting the uplink transmission power includes removing a power level increment by an equation of {[increased power]+[−d×ΔTPC]}, wherein 'd' is a value of deducing an increment of power of another control channel and 'ΔTPC' is power intensity increasing or decreasing according to unit power level.

22. The method of claim 21, wherein the first power level is appropriate for a general control channel transmission power and the second power level is appropriate for the high-speed control channel transmission power.

23. The method of claim 22, wherein the general control channel is a DPCCH.

24. The method of claim 22, wherein the high-speed control channel is a HS-DPCCH.

* * * * *